Feb. 16, 1954 W. J. GRUEN 2,669,655

BALANCED PHASE DETECTOR

Filed Nov. 13, 1950

Inventor:
Wolf J. Gruen,
by Merton D. Moore
His Attorney.

Patented Feb. 16, 1954 2,669,655

UNITED STATES PATENT OFFICE 2,669,655

BALANCED PHASE DETECTOR

Wolf J. Gruen, Syracuse, N. Y., assignor to General Electric Company, a corporation of New York Application November 13, 1950, Serial No. 195,211

8 Claims. (Cl. 250—27)

My invention relates to balanced phase detectors, and more particularly to balanced detectors which are adapted to provide a unidirectional control voltage whose polarity and magnitude are functions of the sign and magnitude of the phase angle between two alternating voltage waves of the same fundamental frequency. While my invention is of general utility, it has particular application to automatic frequency control circuits for the scanning oscillator of a television broadcast receiver, and especially for the line scanning oscillator of such a receiver.

In many instances it is necessary to synchronize an oscillator with an externally-produced synchronizing signal. Such a requirement is found, for example, in television receivers of the modulated carrier wave type in which it is necessary to synchronize the scanning oscillators of the receiver with the scanning generators at the transmitter by means of a synchronizing signal which appears as modulation on the received television signal. Certain arrangements heretofore proposed have employed phase detector circuits in which the received synchronizing pulse wave is combined with a pulse wave derived from the sweep output of the line scanning oscillator to produce a unidirectional control voltage, the magnitude of which varies in accordance with the phase relationship of the synchronizing pulse wave and the output pulse wave. This control voltage is then applied to automatic frequency control circuits for the oscillator, thereby to control its fundamental operating frequency so as to maintain it in precise synchronism with the synchronizing wave.

In order to provide some measure of discrimination against unwanted noise impulses which may be interspersed with the synchronizing pulses, balanced phase detector circuits have heretofore been proposed, incorporating opposed rectifier circuits across which are produced equal and opposite voltages in response to the pulse waves from the synchronizing pulse source and from the oscillator output source, respectively. With such an arrangement, the phase detector system may be balanced with respect to the input synchronizing pulse voltages, so that noise impulses and other extraneous and undesired signals, such as those due to atmospheric static, ignition interference and the like, do not seriously affect the control voltage derived from the balanced detector circuit.

In many prior art systems of this general type, it has been necessary to utilize a phase inverter stage, a transformer with a center-tapped secondary, or an equivalent circuit arrangement, to provide the necessary balanced input voltages for the rectifiers of the phase detector circuit. This is particularly true in a television broadcast receiver in which all of the various voltage sources are normally operated single-ended, that is, in which one terminal of each source is connected to a point of fixed reference potential such as a chassis ground. However, in my prior-filed copending application, Serial No. 87,862, filed April 14, 1949, now Patent No. 2,598,370 dated May 27, 1952, and assigned to the same assignee as the present invention, I have shown how a very satisfactory phase detector circuit may be constructed in which substantially balanced operation is secured even though both of the alternating voltage input sources and the unidirectional output load circuit have one side grounded. As will be explained in somewhat greater detail at a later point in this specification, this is accomplished in my prior circuit by connecting the two rectifiers of the phase detector circuit in series opposition across the output load circuit, with respect to the reference pulses from the scanning oscillator. The two detectors are also connected effectively in parallel, insofar as the synchronizing pulse source is concerned, one of the detectors being connected directly across this source and the other being connected effectively in parallel thereto through a capacitive output load circuit. However, as pointed out in my aforesaid application, conditions of detector balance are approached only when the output load impedance is of relatively low value as compared to the impedances of the detector circuits. These conditions can be approached closely enough to secure very satisfactory operation, as evidenced by the use of this prior form of circuit in many commercial television broadcast receivers, but it would obviously be very desirable to provide a circuit which could be adjusted for perfect balance and still retain the advantages of single-ended operation characteristics of my prior circuit. I have found that it is possible to accomplish this by the addition of a relatively few impedance elements to my prior circuit, in accordance with the present invention, which convert it into a true bridge network capable of precise balance with respect to both the sources of alternating voltage whose phase is to be compared.

It is accordingly a primary object of my invention to provide a new and improved phase discriminator operating on principles similar to those disclosed in my aforesaid copending application, Serial No. 87,862, now U. S. Patent No. 2,498,370, but in which a perfect balance is obtainable.

Another object of my invention is to provide an improved balanced phase discriminator for comparing the phase of two alternating voltages, both derived from single-ended sources, and for developing a resultant unidirectional control voltage, dependent upon their phase, which may be supplied directly to a single-ended output circuit.

Still another object of my invention is to provide an improved phase detector circuit adapted to compare periodic pulse voltages from two separate sources, in which the voltage sources and the detector circuit may all have one common terminal connected to a point of fixed reference potential, and in which perfectly balanced operation may be achieved without the use of phase inverters, center-tapped transformers or similar balancing networks.

More specifically, it is an object of my invention to provide a new and improved, balanced, phase detector circuit which is particularly adapted for controlling the synchronization of the horizontal, or line, deflection circuits of a television receiver.

For additional objects and advantages, and for a better understanding of my invention, attention is now directed to the following description and accompanying drawings. The features of my invention which are believed to be novel are particularly pointed out in the appended claims.

Figure 1:
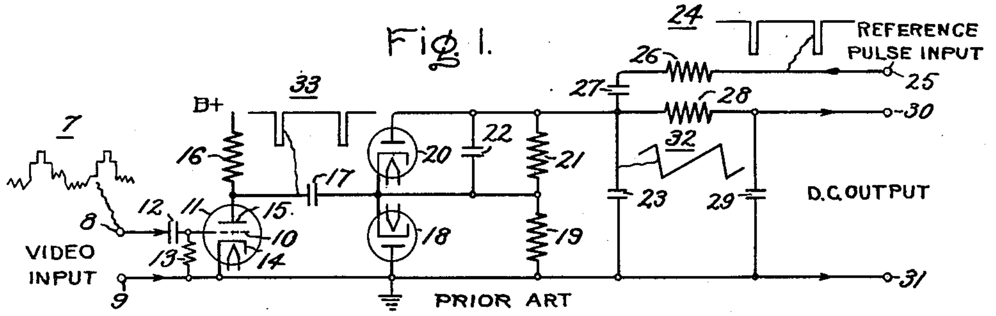
Fig. 1 is a circuit diagram of a phase detector circuit constructed in accordance with the teachings of my aforesaid application, Serial No. 87,862, and which will be referred to in developing the fundamental theory of operation of the present invention.

As explained in my aforesaid application, the phase detector circuit of Fig. 1 may be employed in a television broadcast receiver for developing a control voltage, in response to the line synchronizing pulses of the composite picture signal, which is suitable for frequency control of the line scanning oscillator. The incoming composite picture signal, represented conventionally by the wave form 7, is impressed in positive polarity upon an input terminal 8 with respect to an input terminal 9. Terminal 9 may be connected to a point of common reference potential for the system, represented conventionally as ground. The picture signal 7 is supplied to the control grid 10 of a synchronizing pulse separator tube 11, through a self-bias network comprising series grid capacitor 12 and shunt grid resistor 13. The separator tube 11 is represented as a triode amplifier, including grid 10, a cathode 14 and an anode 15. The cathode 14 is connected directly to ground while anode 15 is connected through an anode load resistor 16 to a suitable source of operating potential, indicated conventionally by the symbol B+.

The anode 15 is connected, through a coupling capacitor 17 to the cathode of a diode detector 18 whose anode is grounded. A diode load resistor 19 is connected across the detector 18. Coupling capacitor 17 also connects directly to the cathode of another diode detector 20 which is similarly shunted by a diode load resistor 21, as well as by a balancing capacitor 22. An alternating current return circuit to ground is completed from the anode of detector 20 through an integrating capacitor 23.

Negative reference pulses 24, which in this application of the circuit may be derived from the output of the horizontal scanning circuits, are impressed between an input terminal 25 and ground. These pulses are impressed across the integrating capacitor 23 through a coupling resistor 26 and blocking capacitor 27. Unidirectional output voltage resulting from the operation of detectors 18 and 20 is supplied through a low-pass filter network, consisting of series resistor 28 and shunt capacitor 29, to output terminals 30, 31.

As is described in greater detail in my aforesaid copending application, Serial No. 87,862, now U. S. Patent No. 2,498,370, the diode detector circuits 18, 19 and 20, 21, 22 of Fig. 1 are reversely connected in series across the source of reference pulses 24. These pulses are integrated in the circuit comprising resistor 26 and capacitors 27 and 23, so that a resultant sawtooth voltage appears across capacitor 23, as represented schematically by the wave form 32. Since the diode detectors 18 and 20 are reversely connected across this source of voltage, the net unidirectional potential thereby produced between output terminals 30 and 31 will be zero if their impedances are balanced.

Since the composite picture signal 7 applied to the input terminals 8, 9 is positive with respect to ground, in the particular circuit of Fig. 1, the separated synchronizing pulses applied to the cathodes of detectors 18 and 20 will be negative, as represented schematically by waveform 33. If the integrating capacitor 23 is of relatively low impedance at the fundamental frequency of these pulses, as compared to the source impedances of the detector circuits, then the two detectors 18 and 20 may be considered as being effectively connected in parallel across the source of synchronizing pulses, as explained in detail in my aforesaid application. If this is realized, then again the unidirectional output voltage due to rectification of the synchronizing pulses alone will also be substantially zero at the output terminals 30, 31. The polarity and magnitude of the resultant unidirectional potential, which is developed across terminals 30, 31 in response to the application of both trains of pulses 9 and 24, for any given amplitude of reference signal 32, will now depend only on the sign and magnitude of the phase angle between the two sources of pulse voltage, providing the previously-mentioned conditions of balance are met. The lower the alternating current impedance between terminals 30 and 31, the more nearly is balanced operation attained; but on the other hand if this impedance is too low, it will cause excessive loading of the reference pulse source.

Figure 2:
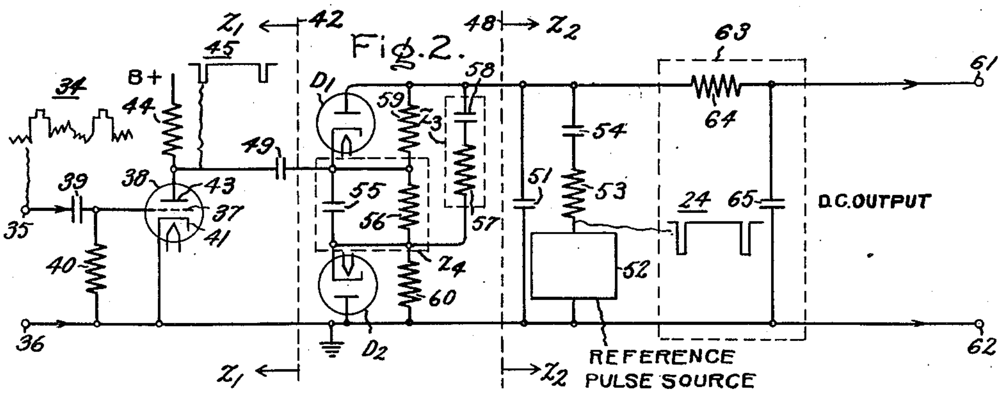
Fig. 2 is a circuit diagram of a balanced phase detector circuit constructed in accordance with the present invention.

The improved circuit of the present invention, shown in Fig. 2, retains all of the advantages of my prior circuit of Fig. 1, and additionally provides perfect balance of the phase detector network. In the particular embodiment illustrated, a composite video signal 34 of positive polarity is impressed upon input terminal 35 with respect to grounded input terminal 36. In the same manner as in Fig. 1, the signal 34 is impressed upon the control grid 37 of a synchronizing pulse separator tube 38 through self-bias network 39, 40. Likewise, the cathode 41 of tube 38 is connected to ground and its anode 43 is connected to a suitable source of operating potential B+ through an anode load resistor 44.

The separated synchronizing pulses 45, of negative polarity with respect to ground at the anode 43, are impressed upon the cathode of a diode detector $D_1$ through a coupling capacitor 49. For reasons that will shortly appear, the total alternating current driving impedance which is seen looking to the left of dashed line 42 into the separator network, is schematically indicated by the symbol $Z_1$. As in the case of the circuit of Fig. 1, an alternating current return path to ground is completed from the anode of diode $D_1$ through an integrating capacitor 51. Likewise, a source 52 of reference pulses, which again may be supplied from the output of the line scanning generator, is connected across capacitor 51 through coupling resistor 53 and blocking capacitor 54. The total alternating current impedance, seen looking to the right of dashed line 48, is represented schematically by the symbol $Z_2$.

The synchronizing pulses are also impressed, through coupling capacitor 49, upon the cathode of a second diode detector $D_2$ whose anode is grounded. However, an important difference between the circuit of Fig. 1 and my improved circuit of Fig. 2 is the addition of an impedance network $Z_4$ which is interposed between the cathode of diode $D_2$ and coupling capacitor 49. As shown in Fig. 2, this impedance $Z_4$ consists of the parallel-connected capacitor 55 and resistor 56. For reasons shortly to be described, the lower terminal of this network is also connected to the upper terminal of capacitor 51 through another impedance network $Z_3$ consisting of a resistor 57 and a capacitor 58 in series.

Direct current return paths for the diode detectors $D_1$ and $D_2$ are respectively provided by diode load resistors 59 and 60. The unidirectional output control voltage from the phase detector is supplied to output terminals 61, 62 through a four-terminal low-pass filter network 63, consisting of series resistor 64 and shunt capacitor 65.

Figure 3:
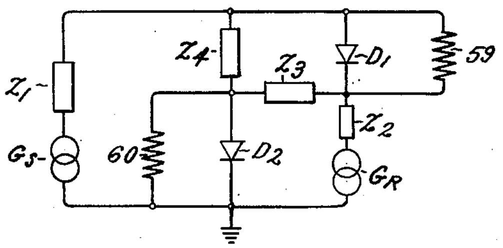
Figs. 3, 4 and 5 are simplified equivalent circuit diagrams for the improved circuit of Fig. 2, which will be referred to in analyzing its operation.

The operation of the phase discriminator circuit of Fig. 2 will be more easily understood if it is redrawn as an equivalent impedance network, as shown in Fig. 3, in which corresponding elements have been indicated by corresponding reference symbols. In Fig. 3, the source of synchronizing pulses has been replaced by the generator $G_s$ and its equivalent driving source impedance $Z_1$. The reference pulse source has also been replaced by generator $G_r$ and its equivalent driving source impedance $Z_2$.

Figure 4:
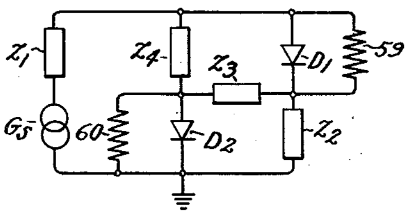

Using the impedance notation of Fig. 3, two very simple equivalent bridge circuits can now be drawn to show the balance of the circuit with respect to each of the driving sources $G_s$ and $G_r$. Fig. 4 is the equivalent bridge network with reference to the synchronizing pulse source $G_s$ and Fig. 5 is the equivalent bridge network with reference to the reference pulse source $G_r$.

Referring now particularly to Fig. 4, let it be assumed that the rectifiers $D_1$ and $D_2$, together with their load resistors 59 and 60, have identical impedance characteristics. It can easily be seen that this bridge circuit is then completely balanced with respect to the voltage from the synchronizing source $G_s$ if $Z_4$ is equal to $Z_2$, irrespective of the values of $Z_1$ and $Z_3$. The rectifiers are then supplied with equal alternating pulse voltages and produce a net unidirectional potential at output terminal 61 which is zero for all values of input voltage, since they are reversely connected so as to produce equal and opposite unidirectional potentials at this point.

Figure 5:
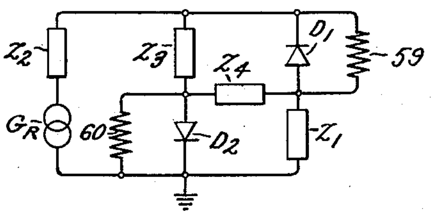

Fig. 5 similarly illustrates the conditions of balance with respect to the equivalent source $G_r$ of reference pulses and its equivalent driving source impedance $Z_2$. Assuming identical detector circuits as before, it will be seen that this network is completely balanced if $Z_3$ is equal to $Z_1$, irrespective of the values of $Z_2$ and $Z_4$. The rectified voltages across detectors $D_1$ and $D_2$ are added in series opposition and again produce a net unidirectional voltage at output terminal 61 which is zero.

The theory of operation of the phase detector circuit in response to both synchronizing and reference pulses has been developed in detail in my aforesaid application, Serial No. 87,862, now U. S. Patent No. 2,498,370. The operation of my improved circuit is identical, for the assumed conditions of perfect balance in the detector network, so will not be repeated in detail here. Suffice it to say that when both the synchronizing pulses and the reference sawtooth voltages are applied to the detectors, then for any given amplitude of reference signal 24 the net unidirectional output voltage from the discriminator will have a polarity and a magnitude corresponding to the sign and magnitude of the phase angle between them.

The most important feature of the present invention is the fact that the phase detector network may now be independently adjusted for exact balance with respect to each of the input driving voltages. This balance holds, within practical limits, over a considerable range of input frequencies. In a practical circuit, the precision of balance depends primarily upon the tolerances of the component parts. It can theoretically be made perfect at any desired frequency. In cases where the anode impedance of the driver tube 38 in Fig. 2 is low in comparison to the capacitive reactance of the balancing capacitor 58, the series resistor 57 may be omitted.

If the sawtooth reference voltage across integrating capacitor 51 is derived from the retrace pulse across the sweep yoke of the line scanning circuits of a television receiver, a slight delay of the synchronizing pulses is generally necessary to avoid fold-over on the right-hand side of the television picture image. It will be readily apparent to those skilled in the art of television receiver design that this delay can be accomplished by choosing proper capacity values so that the total capacitive load across the anode impedance of driver stage 40 (comprising capacitors 49, 55, 58 and 51 in series) provides the desired delay of the synchronizing pulses.

While the rectifiers $D_1$ and $D_2$ have been indicated as being diode detectors of the vacuum tube type, it will also be obvious that solid contact rectifiers, such as selenium or crystal diodes, may be employed. In such case it is important that the back resistances of the crystal diodes, which may replace the diode load resistors 59 and 60, be sufficiently high to insure proper peak rectification of the applied waves. It will also be apparent that from what has been said previously in regard to Figs. 1 and 2, that the diodes $D_1$ and $D_2$ need merely to be reversed if synchronizing pulses of positive polarity are to be fed to the phase detector. The polarity of the pulses from the reference pulse source 52 may also be either positive or negative, depending upon the desired polarity of the output unidirectional control potential. In the application of the invention to automatic frequency control of the line scanning oscillator of a television receiver (for example of the type shown in my aforesaid application), the relative pulse polarities will be determined by the type of reactance tube circuit to which the control voltage is supplied. The proper choice of these relative polarities is a matter of design well understood by engineers skilled in the art.

Merely by way of illustration, and not in any sense by way of limitation, the following are representative component values which were found to give satisfactory circuit operation in a particular application of the phase detector circuit of Fig. 2 to a laboratory television broadcast receiver employing A. F. C. synchronization of the 15.75-kc. line scanning circuits:

| | |
|---|---|
| Tube **43** | ½ Type 6SL7 |
| Tubes $D_1$ and $D_2$ | Type 6AL5 |
| Resistor **47** | 47,000 ohms |
| Capacitor **49** | 120 mmf. |
| Capacitor **51** | 1000 mmf. |
| Resistor **53** | 120,000 ohms |
| Capacitor **54** | .047 mf. |
| Capacitor **55** | 1000 mmf. |
| Resistor **56** | 68,000 ohms |
| Resistor **57** | (omitted) |
| Capacitor **58** | 100 mmf. |
| Resistors **59** and **60** | 1 megohm each |
| Resistor **64** | 150,000 ohms |
| Capacitor **65** | .01 mf. |

Satisfactory balance was demonstrated in this particular receiver by first supplying synchronizing pulse input voltage alone and observing, with an input pulse amplitude of about 50 volts, the output unidirectional voltage was less than 0.1 volt. The same balance was also observed when the synchronizing pulse input was disconnected, and when a reference pulse voltage was applied having about 40 volts peak-to-peak amplitude.

It will thus be apparent that I have provided a balanced detector circuit which is very simple to align for accurately balanced operation, which possesses all the practical advantages of my prior circuit in having one side of all the circuits connected to a common point of reference potential, and which does not require the use of additional phase-inverting circuits.

While a specific embodiment of my invention has been shown and described, and certain modifications therein have been suggested, it will, of course, be understood that various other modifications may be made without departing from the principles of the invention. The appended claims are, therefore, intended to cover any such modifications within the true spirit and scope of the invention.

What I claim as new and desire to secure by Letters Patent of the United States is:

1. A balanced phase detector circuit comprising a four-arm bridge network including a first pair of impedances connected in two diagonally-opposite arms and a pair of rectifiers connected in the remaining two arms, a second pair of impedances connected respectively to diagonal corners of said network, means establishing one corner of said network as a point of reference potential, a first source of alternating voltage of predetermined frequency connected between said reference corner and the diagonally-opposite corner, a second source of alternating voltage of said frequency connected in the impedance arm adjacent said reference corner, and an output terminal connected to a corner of said network at which unidirectional voltages developed across said rectifiers are in opposition with respect to said reference corner, the impedances of said bridge network being balanced so that substantially zero unidirectional voltage is developed at said output terminal in response to either of said alternating voltages alone.

2. A balanced phase detector circuit for comparing the phase of a first pulse wave of predetermined fundamental frequency with a second pulse wave of the same fundamental frequency, comprising a four-arm bridge including a first pair of reactive impedance networks respectively connected in two diagonally-opposite arms and a pair of two-element detectors respectively connected in the remaining two arms, a second pair of reactive impedance networks connected respectively to diagonal corners of said bridge, means establishing one corner of said bridge as a point of reference potential, means for impressing said first wave between said reference corner and the diagonally-opposite corner, and means for impressing said second wave across the impedance network adjacent said reference corner, said detectors being poled to produce, in response to either of said voltages, unidirectional potentials which are in opposition across said last-named network, said networks and said detectors being balanced so that substantially zero unidirectional voltage is developed across said last-named network when said waves are in phase.

3. A balanced phase detector circuit responsive to the phase of periodic waves of a predetermined fundamental frequency with respect to periodic reference waves of the same fundamental frequency, comprising a pair of two-element rectifiers reversely connected in series between first and second terminal points through an intermediate impedance network, means for impressing said reference waves across said points through a second impedance network, means for impressing said first waves across one of said rectifiers and said first impedance network in series through a third impedance network, a fourth impedance network connected across said first impedance network and the other of said rectifiers in series, and a unidirectional-voltage-responsive filter circuit included in said second impedance network, the impedances of said elements and said rectifiers being proportioned to form an alternating current bridge which is balanced so as to produce substantially zero unidirectional voltage across said filter circuit in response to either of said waves alone.

4. A balanced phase detector circuit responsive to the phase of a train of periodic synchronizing pulses with respect to a train of periodic reference pulses of the same fundamental frequency, comprising a pair of diode detector elements reversely connected in series between first and second terminal points through an intermediate reactive impedance, a second reactive impedance, means for impressing said reference pulses across said points through said second reactive impedance, a third reactive impedance, means for impressing said synchronizing pulses across one of said detectors and said first impedance through said third reactive impedance, a fourth reactive impedance connected across said first impedance and the other of said detectors in series, a pair of load resistors respectively shunting said diode detectors, and a unidirectional-voltage-responsive filter circuit included in said second impedance, said impedances, detector and resistors being proportioned to form an alternating current bridge network which is balanced so as to produce substantially zero unidirectional voltage across said filter circuit in response to either of said trains of pulses alone.

5. A balanced phase detector for determining the phase relation between a first wave of predetermined fundamental frequency and a second wave of the same fundamental frequency comprising, means including a first circuit connected to impress said first wave between a first terminal and a common terminal, said circuit presenting an impedance $Z_1$ between said terminals, means including a second circuit connected to impress said second wave between a second terminal and said common terminal, a four-terminal low-pass filter network having its input terminals also connected between said second and common terminals and its output terminals connected to a load circuit, said second circuit and said filter network presenting an impedance $Z_2$ between said second and common terminals, a first rectifier connected between said first and second terminals, a third circuit of impedance $Z_3$ and a second rectifier serially connected in the order named between said second and common terminals and providing a third terminal at their junction, said rectifiers being poled to conduct in opposite directions with respect to said second terminal, and a fourth circuit of impedance $Z_4$ connected between said first and third terminals, said four impedances and said two rectifiers forming a bridge network which is balanced for either of said voltages alone, whereby a unidirectional potential is impressed on said load circuit whose polarity and magnitude are functions of the sign and magnitude of the phase angle between said waves.

6. A balanced phase detector for determining the phase relation between a first unidirectional pulse wave of predetermined fundamental frequency and second unidirectional pulse wave of the same fundamental frequency comprising, means including a first input circuit of reactive impedance $Z_1$ connected to impress said first wave between a first terminal and a common terminal, means including a second input circuit connected to impress said second wave between a second terminal and said common terminal, a four-terminal output filter network having its input terminals also connected between said second and common terminals, said second input circuit and said filter network together providing a reactive impedance $Z_2$ between said second and common terminals, a first rectifier connected between said first and second terminals, a third circuit of reactive impedance $Z_3$ and a second rectifier serially connected in the order named between said second and common terminals and providing a third terminal at their junction, said rectifiers being poled to conduct in opposite directions with respect to said second terminal, and a fourth circuit of reactive impedance $Z_4$ connected between said first and third terminals, said four reactive impedances and said two rectifiers together forming an alternating current bridge network which is balanced for either of said pulse waves alone, whereby a unidirectional potential is impressed on said output filter network whose polarity and magnitude are functions of the sign and magnitude of the phase angle between said waves.

7. A balanced phase detector circuit comprising two rectifiers reversely connected in series through a first, intermediate, impedance network, one of said rectifiers having a terminal connected to a point of fixed reference potential, a second impedance network including a source of alternating reference voltage and the input terminals of a four-terminal low-pass filter network, a third impedance network, means connecting said third network across said first network and the other of said rectifiers in series, means connecting said second network across said third network and said one rectifier in series, a fourth impedance network including a source of alternating voltage whose phase is to be compared to said reference voltage, means connecting said fourth network across said two rectifiers and said first network in series, and an output load circuit responsive to unidirectional potential developed across the output terminals of said filter network, said four impedance networks and said two rectifiers having impedance values selected to form an alternating current which is substantially balanced for either of said alternating voltages alone, whereby said unidirectional potential is a direct function of the phase angle between said voltages.

8. In a television receiver of the type including a source of line synchronizing pulses of predetermined fundamental frequency, a line sweep generator capable of being synchronized by said pulses and means for obtaining feedback pulses from the output of said sweep generator, the combination of a pair of diode detectors reversely connected in series between first and second terminal points through a balancing network having a first predetermined value of capacitive impedance, said network comprising a capacitor shunted by a resistor, input means comprising a pulse separator for impressing said synchronizing pulses across said network and one of said detectors in series, said input means having a second, predetermined value of capacitive impedance, an integrating capacitor connected between said points, feedback means for charging said capacitor in accordance with said feedback pulses, thereby to develop a saw tooth voltage wave in synchronism therewith, a second balancing network having a third, predetermined value of capacitive impedance connected across said first network and the other diode detector in series, and a low-pass filter circuit responsive to the net unidirectional potential between said points, said feedback means, integrating capacitor, and filter circuit presenting a fourth, predetermined value of capacitive impedance across said points, said impedance values and the effective resistances of said detectors being proportioned to form an alternating current bridge network which is balanced so as to produce substantially zero unidirectional potential across said load circuit due to either of said pulses alone.

WOLF J. GRUEN.

References Cited in the file of this patent

UNITED STATES PATENTS

| Number | Name | Date |
|---|---|---|
| 2,250,708 | Herz | July 29, 1941 |
| 2,339,536 | Wendt | Jan. 18, 1944 |
| 2,438,947 | Rieke et al. | Apr. 6, 1948 |
| 2,462,759 | McCoy | Feb. 22, 1949 |
| 2,539,818 | Dome | Jan. 30, 1951 |
| 2,564,471 | Eaton | Aug. 14, 1951 |